Dec. 29, 1964     C. FRANKLIN     3,163,448
CONDUIT JOINT AND SEAL MEMBER THEREFOR
Filed Oct. 3, 1961
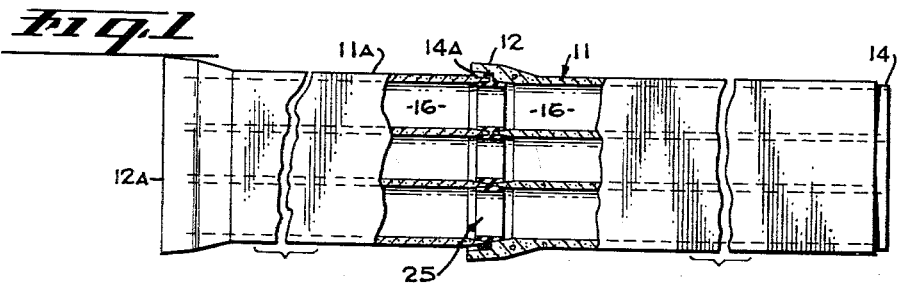
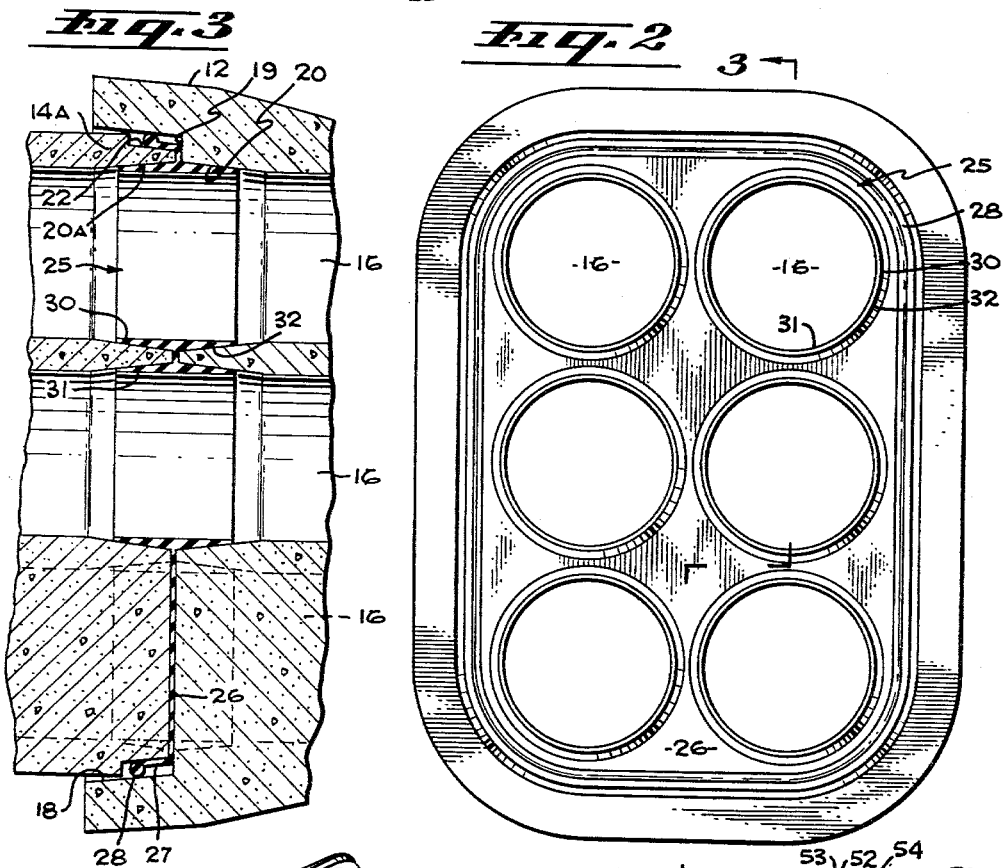
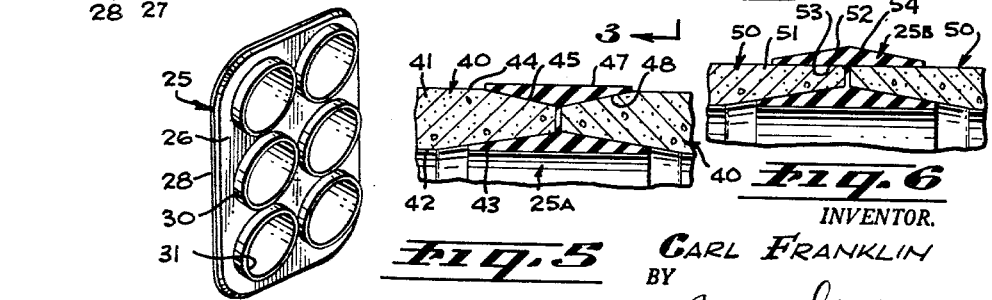
INVENTOR.
CARL FRANKLIN
BY
ATTORNEYS

United States Patent Office 3,163,448
Patented Dec. 29, 1964

3,163,448
CONDUIT JOINT AND SEAL MEMBER THEREFOR
Carl Franklin, Tempe, Ariz., assignor to American Pipe and Construction Co., South Gate, Calif., a corporation of Delaware
Filed Oct. 3, 1961, Ser. No. 142,544
3 Claims. (Cl. 285—137)

This invention has to do with joints for concrete conduits such as are used in housing underground wiring and with means for effecting a seal at the joints of the individual conduit sections.

An object of the invention is to provide a new and improved joint for concrete conduit sections of the type having a plurality of ducts or passages therethrough such as are used underground for housing electrical supply and telephone cables and the like.

Another object is to provide a fluid-tight joint construction for conduit sections having a plurality of ducts therethrough which not only serves to keep out water and moisture from the interior of the conduit but which also serves to retain air or pressure fluid in the conduit at the joints to enable a pull-through wire or the like to be propelled through the conduit by a charge of air or gas.

A further object is to provide a novel seal member in the nature of a gasket which is particularly designed for use between the end walls of conduits having a plurality of ducts therethrough.

These and other objects will be apparent from the drawing and the following description. Referring to the drawing:

FIG. 1 is an elevational view, partly in section, showing two conduit sections and a joint therebetween;

FIG. 2 is an end elevational view of the bell end of the conduit on the right side of FIG. 1 and of the seal member with the other conduit section removed;

FIG. 3 is an enlarged sectional elevational view through the joint of FIG. 1 on the line 3—3 of FIG. 2;

FIG. 4 is an isometric view of the seal member; and

FIGS. 5 and 6 are fragmentary sectional views of the outer wall and joint between conduit sections having corresponding end portions.

More particularly describing the invention, 11 designates a concrete conduit section having a bell end 12 and a spigot end 14. Numeral 11A designates a second conduit section, having a bell end 12A and a spigot end 14A. Each of these conduits is of the so-called telephone conduit type, that is, the sections are made of concrete or other suitable material and each has a plurality of ducts or passages 16 therethrough. In the particular conduit sections shown the ducts are circular in cross section; however, in some forms the ducts are substantially rectangular in cross section.

The bell end of conduit section 11 is shown as having a flared mouth portion 18 which terminates in a radial shoulder 19. Also, each of the ducts 16 is preferably flared outwardly at its ends in the region 20.

The end of the spigot portion of the other conduit is provided with a beveled or inwardly tapered outer section 22 of limited extent. The end portions of the ducts thorugh the section are also flared at 20A at their ends.

In order to provide a simple and effective seal at the joint between the two conduit sections, I provide a gasket-like seal member generally indicated by 25. This has a thin membrane-like, planar body 26 provided with a peripheral flange 27 extending laterally of the body and terminating in an enlarged section or bead 28 which is continuous around the member. The bead is compressed between the surfaces 22 and 18 of the spigot and bell ends respectively of the two sections of conduit thereby serving to effect a seal.

The body 26 of the seal member is provided with a plurality of tubular sections 30 which extend to opposite sides of the body and which are positioned for registration with the ducts or passages of the particular conduit sections with which it is used. In the form shown, the tubular sections are cylindrical on their inner surfaces 31 and provided with tapered outer surfaces 32 which are complementary to the flared end portions of the ducts. Thus, the parts co-fit as best shown in FIG. 3.

The seal member may be made of rubber, synthetic rubber or a suitable plastic such as polyethylene. The parts are simply assembled and forced together to the position in which they are shown in the drawing, and no sealing compound is required.

In FIGS. 5 and 6 I show joints between adjacent ends of conduit sections 40 wherein the end portions of the sections are similar, rather than one being a bell and the other a spigot. In FIG. 5, each conduit section 40 includes the body 41 through which extends a plurality of passages or ducts 42. These ducts are flared at their ends at 43 in the manner of the ducts 16. The outer surface 44 of the body is tapered or beveled at 45 at its end. Between the ends of the sections 40 I provide the gasket-like seal member 25A which is generally similar to the seal member 25 previously described except at its peripheral portion where it is formed with a double flange 47 having tapered inner surfaces 48 to fit the surfaces 45 of the conduit sections.

In some instances it may be desirable to provide conduit sections such as those in FIG. 5 but without the tapered exterior end portions. Thus, in FIG. 6 I show conduit section 50 with plain or straight end portions 51 with which I use a seal member 25B having a peripheral flange portion 52 the inner surfaces 53 of which correspond to the outer surfaces of the conduit sections. If desired the member 25B may have tapered exterior surfaces 54.

Although I have illustrated and described preferred forms of my invention, I contemplate that various changes and modifications can be made therein without departing from the invention, the scope of which is indicated by the following claims.

I claim:

1. In a joint for concrete conduit sections, a first conduit section having a bell end, a second conduit section having a spigot end received in the bell end of said first conduit section, said sections having a plurality of ducts therethrough from end to end, the ducts of one conduit section being in alignment with the ducts of the other conduit section when the sections are assembled in end-to-end relation, and a resilient seal member between the adjacent end faces of said spigot and bell ends, said seal member including a thin, membrane-like planar body having a plurality of tubular sections extending to opposite sides thereof, said tubular sections registering with and projecting into the ducts in said conduit sections, said ducts being flared at their end portions and said tubular sections being externally tapered to fit said flared end portions of the ducts, the interior dimensions of said tubular sections substantially corresponding to the interior dimensions of the ducts inwardly of the flared end portions, said seal member having a peripheral flange provided with a sealing bead received between the exterior of said spigot end of said second conduit section and the interior of the bell end of the other conduit section.

2. A resilient seal member for use as described, comprising a thin, sheet-like planar body having a plurality of tubular sections extending therethrough and projecting on opposite sides thereof, said tubular sections extending normal to the plane of the body, and a continuous peripheral flange extending laterally of said body and having a continuous bead of increased thickness, said tubular sections being characterized by tapering outer surfaces and straight-through inner surfaces.

3. In a joint for concrete conduit sections, a first conduit section, a second conduit section in end-to-end alignment with said first conduit section, said sections having a plurality of ducts therethrough from end to end, the ducts of one conduit section being in alignment with the ducts of the other conduit section, and a resilient seal member between the adjacent end faces of said sections, said seal member including a thin, membrane-like planar body having a plurality of tubular sections extending to opposite sides thereof, said tubular sections registering with and projecting into the ducts in said conduit sections, said ducts being flared at their end portions and said tubular sections being externally tapered to fit said flared end portions of the ducts, the interior dimensions of said tubular sections substantially corresponding to the interior dimensions of the ducts inwardly of the flared end portions.

References Cited in the file of this patent

UNITED STATES PATENTS

| | | |
|---|---|---|
| 369,813 | Rader | Sept. 13, 1887 |
| 388,442 | Phipps | Aug. 28, 1888 |
| 750,444 | Fisher | Jan. 26, 1904 |
| 801,774 | Devonshire | Oct. 10, 1905 |
| 1,786,425 | Christie | Dec. 30, 1930 |
| 1,899,861 | Gackenback | Feb. 28, 1933 |
| 2,890,899 | Simmons | June 16, 1959 |

FOREIGN PATENTS

| | | |
|---|---|---|
| 625,618 | Canada | Aug. 25, 1961 |
| 457,629 | Great Britain | Dec. 2, 1936 |